United States Patent
Šebo et al.

(10) Patent No.: US 9,809,471 B2
(45) Date of Patent: Nov. 7, 2017

(54) METHOD OF DISPOSAL OF CYANOBACTERIA IN STAGNANT WATERS AND EQUIPMENT FOR ITS IMPLEMENTATION

(71) Applicant: TECHNICKÁ UNIVERZITA V KOŠICIACH, Košice (SK)

(72) Inventors: Dušan Šebo, Košice (SK); Miroslav Badida, Košice (SK); Juraj Šebo, Košice (SK); Monika Fedorčáková, Košice (SK)

(73) Assignees: Technicka Univerzita v Kosiciach, Kosice (SK); Centrum VEDECKO-Technickych INFORA Acci SR, Bratislava (SK)

( * ) Notice: Subject to any disclaimer, the term of this patent is extended or adjusted under 35 U.S.C. 154(b) by 0 days.

(21) Appl. No.: 14/385,196

(22) PCT Filed: Mar. 14, 2013

(86) PCT No.: PCT/SK2013/000003
§ 371 (c)(1),
(2) Date: Sep. 15, 2014

(87) PCT Pub. No.: WO2013/137834
PCT Pub. Date: Sep. 19, 2013

(65) Prior Publication Data
US 2015/0041332 A1   Feb. 12, 2015

(30) Foreign Application Priority Data
Mar. 16, 2012   (SK) .................................. 48-2012 U

(51) Int. Cl.
*B63B 35/32*   (2006.01)
*C02F 1/461*   (2006.01)
(Continued)

(52) U.S. Cl.
CPC .......... *C02F 1/46104* (2013.01); *B63B 35/32* (2013.01); *C02F 1/465* (2013.01);
(Continued)

(58) Field of Classification Search
CPC ...... C02F 1/467; C02F 1/4672; C02F 1/4674; C02F 1/46104; C02F 1/4606; C25B 1/003
See application file for complete search history.

(56) References Cited

U.S. PATENT DOCUMENTS 4,256,552 A * 3/1981 Sweeney ............. C02F 1/46109
                                                   204/256
5,059,296 A * 10/1991 Sherman ............... C02F 1/4602
                                                   204/229.8
(Continued)

FOREIGN PATENT DOCUMENTS

DE   19731309   1/1999
FR    2791947   2/2001
(Continued)

*Primary Examiner* — Keith Hendricks
*Assistant Examiner* — Salil Jain
(74) *Attorney, Agent, or Firm* — Defillo & Associates, Inc.; Evelyn A Defillo

(57) ABSTRACT

An equipment for disposal of cyanobacteria in stagnant waters has a float structure, to which two types of bipolar electrodes (1 and 6) are mounted under the surface of water, interconnected and supplied with electric direct current via an alternator (10). The equipment comprises a supporting float (5) having the shape of a hollow body, in which there is a transversely positioned rib (4) with an attached suspended electrode (1), interconnected to supplies of photovoltaic cells (8) and alternator (10), fixed on the rib (4) there is the device (9) for utilizing wind power, connected to an alternator (10), driving the water pump (2), which is placed in the delivery pipe (3) and is connected directly to the axis of the device (9), for utilization of wind power. Fixed on the supporting float (5) there is the upper float (7) with the (Continued)

Figure 1:
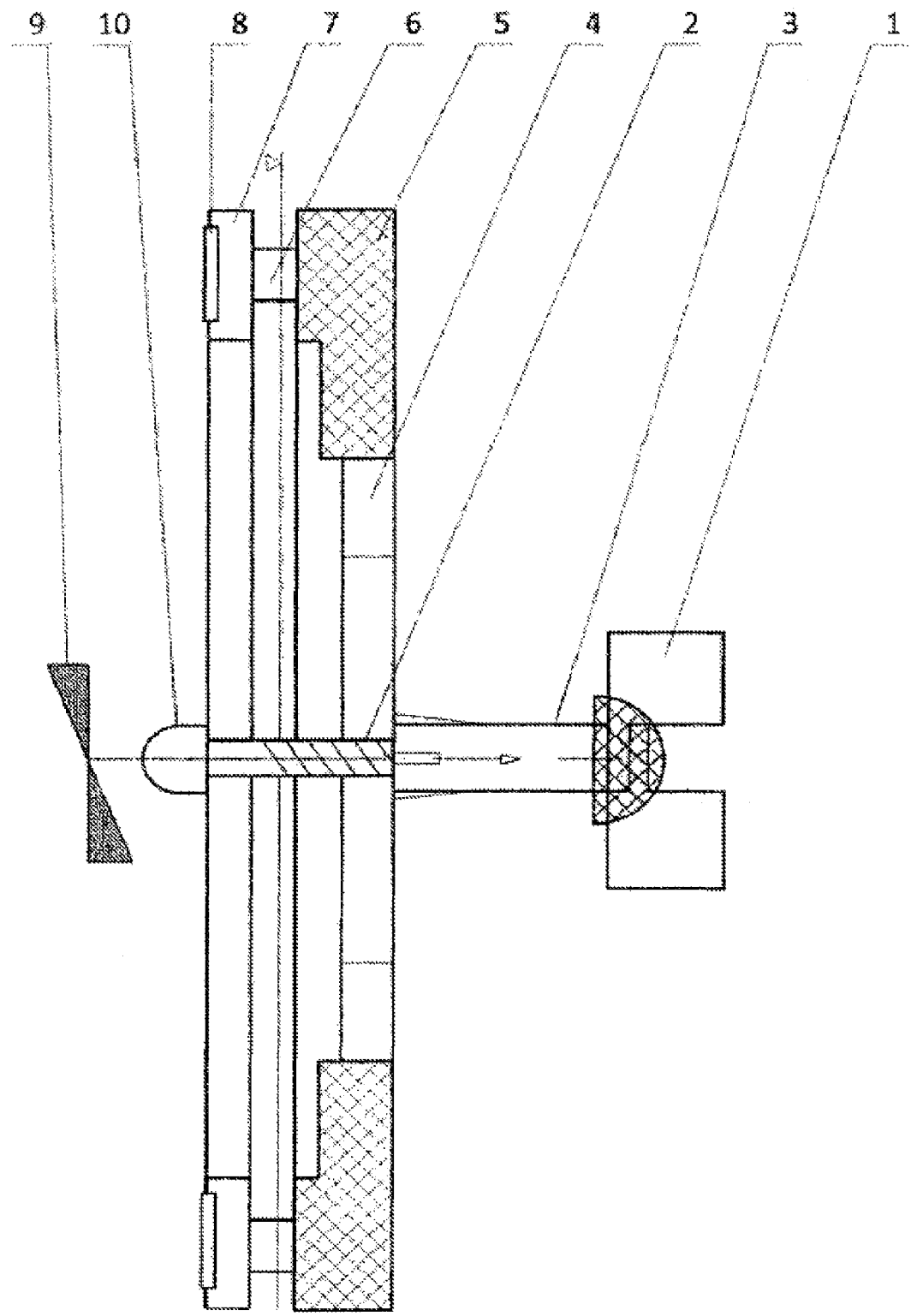
Figure 2:
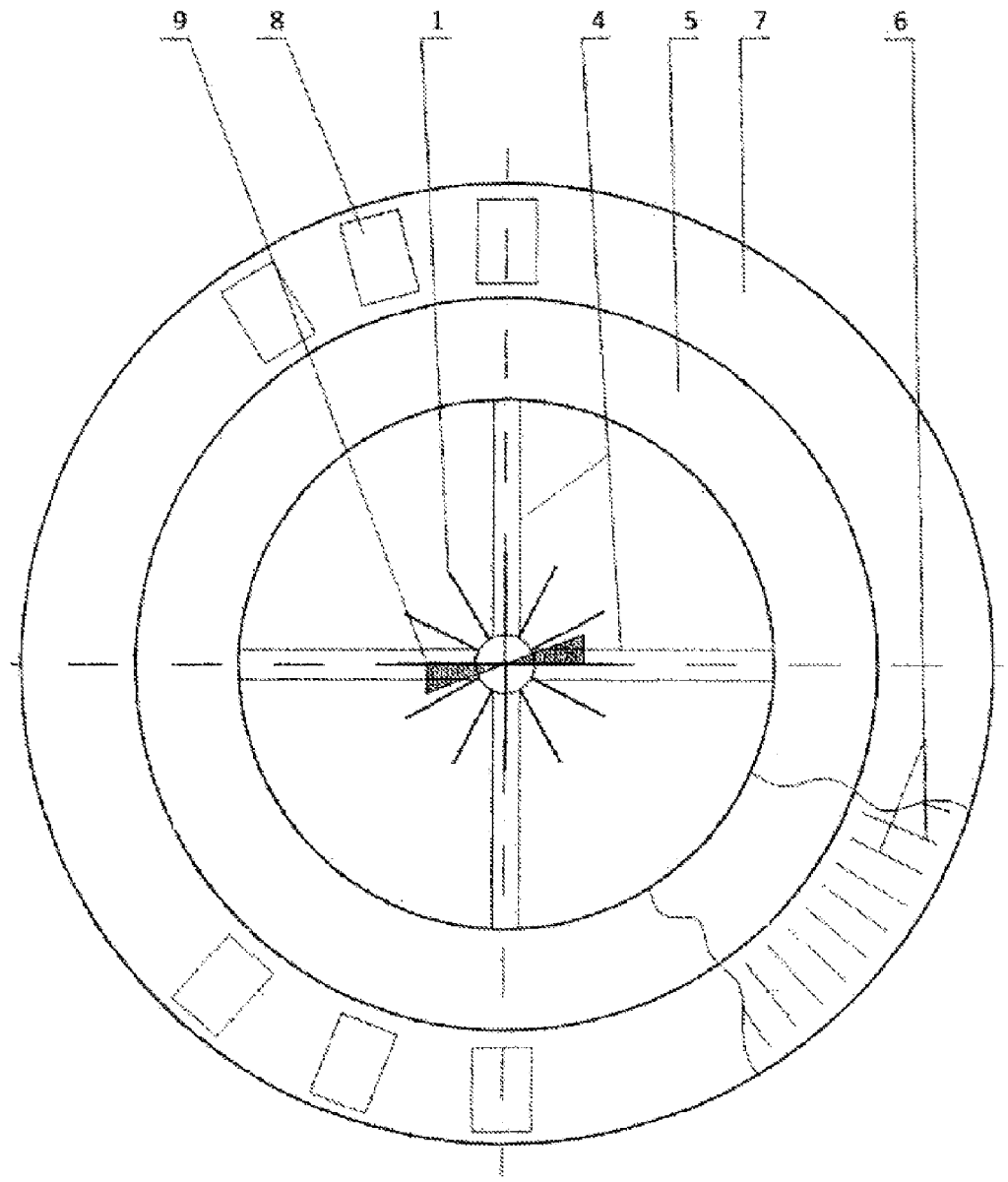

anchored grid electrode (6) and with the stored photovoltaic cells (8), interconnected with the electrodes (1) and (6). The delivery pipe (3) is connected to the water pump (2), and the outlet of the delivery pipe (3) is positioned directly above the suspended electrode (1). The upper float (7) copies the shape of the supporting float (5) and is made of a dielectric, light, floating material. The method of disposal of cyanobacteria in stagnant waters is based on quatrolytic disposal of cyanobacteria by the electroflotation method, by means of the above-mentioned equipment.

4 Claims, 2 Drawing Sheets

(51) Int. Cl.
    *C02F 1/465*     (2006.01)
    *C02F 1/467*     (2006.01)
    *B63B 35/44*     (2006.01)
    *C02F 103/00*     (2006.01)

(52) U.S. Cl.
    CPC ........ *C02F 1/467* (2013.01); *B63B 2035/446* (2013.01); *B63B 2035/4453* (2013.01); *C02F 2103/007* (2013.01); *C02F 2201/46105* (2013.01); *C02F 2201/46165* (2013.01); *C02F 2303/04* (2013.01); *C02F 2303/20* (2013.01)

(56) References Cited

U.S. PATENT DOCUMENTS

| | | | | |
|---|---|---|---|---|
| 5,364,512 A | * | 11/1994 | Earl | ............ C02F 1/4606 204/229.6 |
| 5,676,805 A | * | 10/1997 | Silveri | ............ C02F 1/4602 204/212 |
| 6,508,929 B1 | | 1/2003 | Mercer | |
| 7,238,278 B2 | * | 7/2007 | Coffey | ............ C02F 1/4606 204/228.1 |
| 7,815,780 B2 | * | 10/2010 | Djordjevic | ............ B08B 3/12 204/273 |
| 8,651,766 B2 | * | 2/2014 | Kortmann | ............ B01F 3/04595 261/120 |
| 2002/0078990 A1 | | 6/2002 | Munk | |
| 2005/0067300 A1 | | 3/2005 | Tremblay | |

FOREIGN PATENT DOCUMENTS

| | | |
|---|---|---|
| FR | 20000000046 | 7/2001 |
| WO | WO9010097 | 9/1990 |
| WO | WO9938810 | 8/1999 |
| WO | WO2008125154 | 10/2008 |
| WO | WO2009030977 | 3/2009 |

* cited by examiner

METHOD OF DISPOSAL OF CYANOBACTERIA IN STAGNANT WATERS AND EQUIPMENT FOR ITS IMPLEMENTATION

CROSS REFERENCE TO RELATED APPLICATION

This application is a national stage entry of PCT/SK2013/000003 filed Mar. 14, 2013, under the International Convention claiming priority over Slovakia Application No. PUV 48-2012 filed Mar. 16, 2012.

TECHNICAL FIELD

The technical solution relates to a method of disposal of cyanobacteria in stagnant waters of lakes and dams by using a quatrolytic method and equipment intended for their disposal.

BACKGROUND ART

The overabundance of cyanobacteria and of algae in stagnant waters, known as eutrophication of water, is a worldwide problem, especially because of the fact that vegetative secretions of cyanobacteria are toxic.

Currently, cyanobacteria in stagnant waters of lakes and dams are disposed of by means of biomechanical equipment using float structures, built on the principles of biological reduction of phosphorus and nitrogen in water by cultivating special aquatic plants. The disadvantages of these devices are low efficiency, requirement of taking care of plant growth and limitations due to the vegetation period of plants—E 10822, WO2009030977 (A2).

Also known are facilities for mechanical disposal of cyanobacteria, on the principle of dredging the bottom of water reservoirs from their banks, or by using water-born dredgers. This technology is expensive and has only a short-term effect because reproduction of cyanobacteria is dependent on the content of phosphorus and nitrogen in water, which are not eliminated by these devices—FR20000000046, FR2791947 (A3).

Also used are technologies on chemical or biological principles, by means of equipment on the principle of dispensers—WO9938810 (A1). However, disposal of cyanobacteria by chemical treatment of water destroys biological life in the water in its entirety, thus also affecting macrological forms of life. The most common way of limiting the growth of cyanobacteria in water reservoirs is the application of toxic substances for cyanobacteria and algae—the use of algicidal or algistatic substances. Although the advantages of this method are its relatively easy application and low time consumption, it is not possible to determine in advance, whether such intervention will be effective, environmentally friendly and economically advantageous.

Devouring of cyanobacteria by natural predators is rare and is restricted, for example to the use of cyanophage viruses, also of bacteria, such as actinomycetes and flexibacter, which affect the cell wall of the cyanobacterium, thus preventing photosynthesis, however, the secondary effects of this method are unexplored yet. Using algae, fungi and protozoa also disrupts the overall biodiversity of waters and is not effective—DE19731309 (A1).

Cavitation is also a well-known method of disposal of cyanobacteria from the bottom of reservoirs.

DISCLOSURE OF INVENTION

These deficiencies are removed by a technical solution, the basis of which is the combination of the method of disposal of cyanobacteria in stagnant waters and the equipment for its implementation. The equipment comprises a float structure serving for keeping two types of electrodes under water. The electrodes are placed in the water one above the other and they are bipolar. The upper electrode is a system of anodes and cathodes, and the same applies for the lower electrode.

The lower electrode multiplies the effect of the electrolysis; thereby creating quatrolysis—in similar way like the grid of a vacuum tube influences the current of electrons. Quatrolysis occurs between the electrodes in a wide range around the float in distinct circles of force, thereby multiplying the effect of electrovoltaic flotation on the disposal of cyanobacteria. The circles of force create an environment harmful for cyanobacteria by transferring the electrical charge into the water.

At the bottom of the body of the equipment there are cascade steps serving for capturing impurities, which are slowly settling in the equipment due to water flow. The accumulated sediment is then used as food for animals and partly it is disintegrating at the bottom.

At the same time, the equipment for disposal of cyanobacteria comprises facilities for producing electric power, a rotary power source and photovoltaic cells for powering the electrodes by direct electric current via an alternator. It also includes a device for utilization of wind power, which may be, for example, in the form of a wind propeller, of an engine, of an impeller or of an air turbine, and which drives a rotating source of direct electrical current and of a blade wheel, also of a power blower, which drives the rotary source of direct electric current, as well as a screw water pump, which accelerates the movement of water in the interior of the circular float and drives the rotary source of direct electric current.

The quatrolytic method of the disposal of cyanobacteria is an electrovoltaic electroflo-tation method with multiplying effect, i. e. it is water treatment based on acceleration of natural self-cleansing effects of different electrical potentials in water combined with flotation, and thus carrying away cyanobacteria by bubbles of oxygen and hydrogen generated by electrolysis of water. Molecules of water are decomposed; hydrogen is deposited at the cathode and oxygen at the anode. The bubbles of oxygen and of hydrogen, resulting from quatrolysis of water, also carry away, on the principle of electroflotation, the destroyed cyanobacteria onto the water surface, where their natural environment is changed and the cyanobacteria do not survive. In addition, during quatrolysis, waters contaminated with cyanobacteria, algae and bacteria, prevent in a wide range the intermembrane exchange of nutrients for unicellular organisms and also increase the gas content of the cyanobacteria, which brings them out onto the surface.

During quatrolysis, mineral salts dissolved in the natural water of a lake are decomposed to positively charged metal ions—to cations of calcium, magnesium, potassium, sodium, of heavy metals and of other metals, and to acidic residues with a negative charge of chlorine, sulphur, phosphorus, partially of nitrogen, etc.—to anions. Water in the vicinity of the equipment, produced on the principle of the quatrolysis process, acquires new features, particularly if two special types of electrodes are used as outfit—a suspended electrode and a grid electrode. Both types of produced water, i. e. alkaline and acidic, thus acquire totally different properties, which they are able to maintain for some time, and which are unsuitable for the life of the cyanobacteria.

Cations and anions resulting from dissociation of molecules of a soluble substance, nitrates and phosphates, are unsuitable for the life of the cyanobacteria. The two types of ions in an electric field between the electrodes are subject to equal forces, they are moving and transferring the electric charge also to the cyanobacteria and thus they are paralysing them. When transporting electric current by the electrolyte, all the ions of the lake water are participating as an electrolyte, therefore they are transferring a portion of the electric current in a wide range and that is why this method is effective in the space outside the electrodes as well.

BRIEF DESCRIPTION OF DRAWINGS

FIG. 1 shows the cross-sectional view of the equipment for the disposal of cyanobacteria.

FIG. 2 shows the front view of the equipment for the disposal of cyanobacteria.

MODE FOR CARRYING OUT THE INVENTION

The equipment for the disposal of cyanobacteria in stagnant waters comprises the supporting float 5, in the form of a closed hollow cylinder, containing the transversely positioned rib 4. Mounted on it is the device 9 for utilizing wind energy, which drives the water pump 2, placed in the delivery pipe 3 and the electric power supply—the alternator 10. The upper supporting part of the equipment—the upper float 7, copies the shape of the supporting float 5, it is made of a dielectric, light, floating material and serves for anchoring the grid electrode 6, as a system of radially distributed electrodes. Placed on the upper float 7, there are the photovoltaic cells 8, interconnected to the bipolar electrodes 1 and 6. The alternator 10. also supplies the bipolar electrodes 1 and 6 with direct current. Hanged on the rib 4, there is the suspended electrode 1, connected to the sources of photovoltaic cells 8 and alternator 10. The body of the supporting float 5 of the equipment for the disposal of the cyanobacteria is a float device, where at the bottom part there are the cascade steps serving for retaining the impurities slowly gathered by the water flow into the encircled interior of the supporting float 5, where they are settled. The accumulated sediment is then used as food for animals and partly it is disintegrating at the bottom. The body of the equipment is made of plastic material so that it may be as light and as firm as possible, and at the same time may be able to float on the water. The electrodes forming the suspended electrode) are mutually interconnected and they are powered by wind power via the supply source of electric current 10—the alternator. In the vicinity of the supporting float 5, serving for holding the two types of bipolar electrodes 1 and 6 under the surface of water, quatrolysis of water is produced by mutual rotation of the electrodes 1 and 6 horizontally, in a wide range around the supporting float 5, in distinct power circles; at this process oxygen and hydrogen bubbles arising due to quatrolysis of water carry away the destroyed cyanobacteria, on the principle of electroflotation, onto the water surface, where their natural environment is changed, as a result of which the cyanobacteria do not survive. The disposal of the cyanobacteria is caused by cations and anions produced by dissociation of nitrate and phosphate molecules, inasmuch as both types of ions are unsuitable for the life of the cyanobacteria. When transporting electrical power by the electrolyte, all ions of water-soluble substances are participating in the process.

They are affected by equal forces in the electric field between the bipolar electrodes 1 and 6, they are moving and transferring the electric charge also on the cyanobacteria and thus they are paralysing them.

For circulation of water through the grid electrode 6, the screw water pump 2 with holes in the delivery pipe 3 is used. The water pump 2 is connected directly to the axis 9 of the equipment for utilization of wind energy. The delivery pipe 3 is connected to the water pump 2 with holes and serves for directing the movement of water required for water circulation. The outlet of the delivery tube (pipe) 3 is situated directly over the suspended electrode 1. As the result of pressure and movement of water flowing out of the delivery pipe 3, the outgoing water is flowing around the suspended electrode 1 and enhances its movement around the bipolar electrodes 1 and 6. The bottom part of the supporting float 5 is a supporting component part and may have a diameter D=from 2 to 15 m. It is actually a hollow disc made of plastic, metal and wood, having the width, for example from 600 to 700 mm and height of 500 mm. The grid electrode 6 comprises plates of sheet metal, which are situated in the lower part of the supporting float 5. They are mounted in the upper float 7, distributed evenly around the entire perimeter and connected to the photovoltaic cells 8 and alternator 10. respectively, and thus they serve as electrodes. They are placed so that they may capture even very coarse impurities, which could damage the interior of the equipment for disposal of cyanobacteria. The upper float 7 serves for fixing and interconnecting the modules of the photovoltaic cells 8. Electric power is supplied from the photovoltaic cells 8, interconnected so that safe voltage up to 24 V may be generated between the bipolar electrodes 1 and 6.

INDUSTRIAL APPLICABILITY

The method and the equipment for the disposal of cyanobacteria in stagnant waters can be advantageously used for the disposal of cyanobacteria in stagnant waters, which are intended for supplying drinking water or for swimming, fish farming and there where it is necessary to ensure the quality of microlife in water and to reduce the degree of water eutrophication.

The invention claimed is:

1. An equipment for disposal of cyanobacteria in stagnant waters comprising:

- a hollow floating device having a top float connected to a low float;
- photovoltaic cells connected to the top float;
- bipolar electrodes distributed around a perimeter of the top float, the bipolar electrodes being located between the top float and the low float, the bipolar electrodes being connected to the photovoltaic cells and including metallic plates situated in the low float;
- a rib positioned inside the hollow floating device and placed perpendicularly between the low float and the top float;
- an alternator located on the upper side of the top float;
- a wind generation device mounted on the upper float, the wind generation device being operatively connected to the alternator;
- a water pump having a first end connected directly to the wind generation device;

a perforated pipe having a first end and an outlet end, the first end of the perforated pipe connected to a second end of the water pump;

a suspended bipolar electrode located outside the hollow floating device and connected to an outer side of the low float, the suspended bipolar electrode being connected to the photovoltaic cells and the alternator; and wherein the outlet end of the perforated pipe is positioned directly above the suspended bipolar electrode;

wherein the bipolar electrodes are located above the suspended bipolar electrode;

wherein the bipolar electrodes and the suspended bipolar electrode rotate alternately to the left and to the right creating distinct circles of electrical charge;

the water pump circulating water through the bipolar electrodes inside the hollow floating device.

2. The equipment in accordance with claim 1, wherein the top float has a shape equal to a shape of the low float and is made of a plastic material.

3. The equipment according to claim 1, wherein the wind generation device is a turbine, a propeller, or an engine.

4. An equipment for disposal of cyanobacteria in stagnant waters comprising:

a hollow floating device having a top float connected to a low float;

photovoltaic cells connected to the top float ;

bipolar electrodes distributed around a perimeter of the top float, the bipolar electrodes being connected to the photovoltaic cells and including metallic plates situated in the low float;

a rib positioned inside the hollow floating device and placed perpendicularly between the low float and the top float;

an alternator located on the upper side of the top float;

a wind generation device mounted on the upper float , the wind generation device being operatively connected to the alternator;

a water pump having a first end connected directly to the wind generation device;

a perforated pipe having a first end and an outlet end, the first end of the perforated pipe connected to a second end of the water pump;

a suspended bipolar electrode, the suspended bipolar electrode being connected to the photovoltaic cells and the alternator; and wherein the outlet end of the perforated pipe is positioned directly above the suspended bipolar electrode;

wherein the bipolar electrodes are located above the suspended bipolar electrode;

wherein the bipolar electrodes and the suspended bipolar electrode rotate alternately to the left and to the right creating distinct circles of electrical charge;

the water pump circulating water through the bipolar electrodes inside the hollow floating device;

wherein a bottom side of the low float includes cascade steps.

* * * * *